(12) United States Patent
Shin et al.

(10) Patent No.: US 8,149,670 B2
(45) Date of Patent: Apr. 3, 2012

(54) OPTICAL DISK APPARATUS AND METHOD OF DRIVING THE SAME

(75) Inventors: Jong-hyun Shin, Suwon-si (KR); An-sik Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1079 days.

(21) Appl. No.: 12/033,994

(22) Filed: Feb. 20, 2008

(65) Prior Publication Data

US 2009/0059753 A1    Mar. 5, 2009

(30) Foreign Application Priority Data

Sep. 5, 2007    (KR) .................. 10-2007-0089967

(51) Int. Cl.
*G11B 7/00* (2006.01)
(52) U.S. Cl. ................. 369/53.38; 369/44.25; 369/53.23
(58) Field of Classification Search ............... 369/53.23, 369/53.28
See application file for complete search history.

(56) References Cited

U.S. PATENT DOCUMENTS

| | | |
|---|---|---|
| 2003/0067850 A1 | 4/2003 | Takahashi et al. |
| 2006/0187773 A1 | 8/2006 | Ishimoto |
| 2008/0267036 A1 | 10/2008 | Lee et al. |

FOREIGN PATENT DOCUMENTS

| | | |
|---|---|---|
| CN | 1942945 | 4/2007 |
| JP | 2004-220743 | 8/2004 |
| WO | WO 2005/101391 | 10/2005 |
| WO | WO 2007066258 A2 * | 6/2007 |

OTHER PUBLICATIONS

International Search Report issued in PCT International Application No. PCT/KR2008/001154 on May 29, 2008.
Chinese Office Action issued on Mar. 14, 2011, in corresponding Chinese Application No. 200880105748.0 (6 pages).

* cited by examiner

*Primary Examiner* — Adam R Giesy
(74) *Attorney, Agent, or Firm* — NSIP Law (57) ABSTRACT

An optical disk apparatus includes a light focusing element arranged to face a disk and to focus light emitted from a light source on the disk, an actuator to move the light focusing element towards and away from the disk according to an actuator driving voltage, a light intensity detection unit to detect an intensity of light reflected by the light focusing element and generate a gap error signal based on the detected intensity, a servo unit to generate the actuator driving voltage and a predetermined threshold voltage based on the gap error signal generated by the light intensity detection unit and to provide the actuator driving voltage to the actuator, a distance detection unit to detect a first distance at which the actuator driving voltage is maintained when the threshold voltage is detected using the gap error signal and to detect a second distance at which a gap between the light focusing element and the disk is shorter than the first distance and at which a gap servo operation is started based on the gap error signal; and a control unit to control the servo unit to start the gap servo operation based on the detected first and second distances.

14 Claims, 11 Drawing Sheets

OPTICAL DISK APPARATUS AND METHOD OF DRIVING THE SAME

CROSS-REFERENCE TO RELATED APPLICATION

This application claims the benefit of Korean Application No. 2007-89967, filed Sep. 5, 2007 in the Korean Intellectual Property Office, the disclosure of which is incorporated herein by reference in its entirety.

BACKGROUND OF THE INVENTION

1. Field of the Invention

Aspects of the present invention relate to an optical disk apparatus and a method of driving the same and, more particularly, to a near-field optical disk apparatus and a method of driving the same to prevent a light focusing element and a disk from colliding with each other due to overshoot generated during a gap pull-in operation.

2. Description of the Related Art

Recently, a near-field optical disk apparatus to achieve a high data transfer rate has been proposed. Near-field optical disk apparatuses are also referred to as near-field recording systems. A near-field optical disk apparatus records data on a disk or reproduces data recorded on the disk using light in a near-field where diffraction of light does not occur. Accordingly, the near-field optical disk apparatus is required to control a gap distance between the end surface of a solid immersion lens (SIL) attached to a light focusing element, such as an object lens, and an optical disk such that the gap distance becomes very small. Generally, this gap distance corresponds to half the wavelength of an input laser beam. For example, the gap distance may be approximately 200 nm when a celadon laser having a wavelength of 400 nm is used.

In a near-field optical disk apparatus, an optical disk absorbs some of the incident light. Thus, the intensity of reflected light is reduced in a near-field state in which an actuator is moved towards the optical disk. This reduction of the intensity of reflected light as the actuator is moved towards the optical pickup decreases a gap error signal. When the gap error signal reaches a target point, the near-field optical disk apparatus performs a focus pull-in operation. The focus pull-in operation may also be referred to as a gap pull-in operation because the focus pull-in operation performed by the near-field optical disk apparatus may include performing a gap pull-in operation.

When the gap pull-in operation is performed, overshoot may be generated. This overshoot is generated due to the momentum of the actuator when an initial gap servo operation is performed in an operation of controlling a gap according to the intensity of light reflected from a disk to a SIL due to the near-field effect. Overshoot of less than several μm is not a problem in a conventional optical disk system. However, a similar amount of overshoot causes the disk and the SIL to collide with each other in a near-field optical disk apparatus.

SUMMARY OF THE INVENTION

Aspects of the present invention provide an optical disk apparatus and a method of driving the same to reduce overshoot and thereby prevent a light focusing element and a disk from colliding with each other in a near-field optical disk apparatus.

According to an aspect of the present invention, a gap pull-in method in an optical disk apparatus including a light source to emit light, a light focusing element arranged to face a disk and to focus the light emitted from the light source on the disk, and an actuator to move the light focusing element towards or away from the disk, includes: applying an actuator driving voltage to the actuator to move the light focusing element toward the disk, detecting a gap between the light focusing element and the disk; maintaining the applied actuator driving when the gap between the light focusing element and the disk becomes a first distance which is shorter than a distance at which a near-field effect begins, detecting runout of the disk while maintaining the actuator driving voltage and performing a gap servo operation when the gap between the light focusing element and the disk becomes a second distance which is shorter than the first distance as a result of the detected runout.

According to an aspect, the gap between the light focusing element and the disk is detected using a gap error signal.

According to an aspect, the maintaining of the actuator driving voltage includes maintaining the actuator driving voltage when a threshold voltage corresponding to the first distance is detected.

According to an aspect, the maintaining of the actuator driving voltage includes stopping a movement of the actuator.

According to an aspect, the gap pull-in method further includes stopping the gap servo operation and controlling the actuator to move the light focusing element away from the disk when the gap between the light focusing element and the disk becomes a third distance shorter than the second distance.

According to an aspect, the actuator driving voltage includes a ramp voltage.

According to an aspect, the gap pull-in method further includes starting the gap servo operation in at least one predetermined gap between the first distance and the second distance, controlling the actuator to move the light focusing element towards the disk until the gap between the light focusing element and the disk becomes the second distance, and performing the gap servo operation when the gap between the light focusing element and the disk becomes the second distance.

According to another aspect of the present invention, a gap pull-in method for an optical disk apparatus including a light source to emit light, a light focusing element arranged to face a disk and to focus the light emitted from the light source on the disk, and an actuator to move the light focusing element towards or away from the disk, includes: reducing an actuator driving voltage to move the light focusing element away from the disk if a first distance, which is shorter than a distance at which a near-field begins, is not detected when the actuator is controlled to move the light focusing element towards the disk when the actuator driving voltage reaches a predetermined maximum driving voltage, detecting a gap between the light focusing element and the disk while controlling the actuator to move the light focusing element away from the disk, maintaining the actuator driving voltage when the detected gap between the light focusing element and the disk becomes the first distance; detecting runout of the disk while maintaining the actuator driving voltage, and starting a gap servo operation when the gap between the light focusing element and the disk becomes a second distance shorter than the first distance as a result of the detected runout.

According to another aspect, the reducing of the actuator driving voltage to move the light focusing element away from the disk includes decreasing an actuator descending speed to be slower than a disk runout speed.

According to another aspect of the present invention, a gap pull-in method for an optical disk apparatus including a light source to emit light, a light focusing element arranged to face a disk and to focus the light emitted from the light source on the disk, and an actuator to move the light focusing element towards or away from the disk, includes applying an actuator driving voltage to the actuator to move the light focusing element toward the disk, detecting a gap between the light focusing element and the disk, maintaining the applied actuator driving voltage for a predetermined period of time to stop a movement of the actuator when the detected gap between the light focusing element and the disk becomes a first distance which is shorter than a distance at which a near-field effect begins, and starting a gap servo operation when the gap between the light focusing element and the disk becomes the first distance after the predetermined period of time has elapsed.

According to another aspect, the maintaining of the actuator driving voltage includes maintaining the actuator driving voltage when a threshold voltage corresponding to the first distance is detected, and stopping the movement of the actuator while maintaining the actuator driving voltage.

According to another aspect, the predetermined period of time corresponds to a period of time in which the threshold voltage is detected.

According to another aspect, the gap pull-in method further includes starting the gap servo operation in at least one predetermined gap between the distance at which the near-field effect begins and the first distance, controlling the actuator to move the light focusing element toward the disk until the gap between the light focusing element and the disk becomes the first distance, and continuing to perform the gap servo operation when the gap between the light focusing element and the disk becomes the first distance.

According to another aspect, the gap pull-in method further includes stopping the gap servo operation and controlling the actuator to move the light focusing element away from the disk when the gap between the light focusing element and the disk becomes a second distance which is shorter than the first distance.

According to another aspect, the gap pull-in method further includes applying a virtual driving signal opposite to the actuator driving voltage when the gap servo operation is started to cancel momentum of the actuator towards the disk.

According to another aspect of the present invention, an optical disk apparatus includes a light source to emit a light, a light focusing element arranged to face a disk and to focus the emitted light on the disk, an actuator to move the light focusing element towards and away from the disk according to an actuator driving voltage, a light intensity detection unit to detect an intensity of light reflected by the disk and to generate a gap error signal based on the detected intensity, a servo unit to generate the actuator driving voltage and a predetermined threshold voltage based on the generated gap error signal and to provide the actuator driving voltage to the actuator, a distance detection unit to detect a first distance at which the provided actuator driving voltage is maintained when the threshold voltage is detected using the generated gap error signal and to detect a second distance at which a gap between the light focusing element and the disk is shorter than the first distance and at which a gap servo operation is started based on the gap error signal, and a control unit to control the servo unit to start the gap servo operation based on the detected first and second distances.

According to another aspect, the control unit applies the actuator driving voltage to the actuator to move the light focusing element toward the disk, detect the gap between the light focusing element and the disk, maintain the actuator driving voltage when the detected gap becomes the first distance, detects runout of the disk while maintaining the actuator driving voltage, and control the servo unit to start the gap servo operation when the gap between the light focusing element and the disk becomes the second distance.

According to another aspect, the control unit detects the gap between the light focusing element and the disk using the generated gap error signal.

According to another aspect, the control unit controls the servo unit to stop a movement of the actuator when maintaining the provided actuator driving voltage.

According to another aspect, the distance detection unit detects a third distance at which the gap between the light focusing element and the disk is shorter than the second distance, stops the gap servo operation when the third distance is detected, and controls the actuator to move the light focusing element away from the disk when the gap servo operation is stopped.

According to another aspect, the control unit starts the gap servo operation in at least one predetermined gap between the first distance and the second distance, control the actuator to move the light focusing element towards the disk until the gap between the light focusing element and the disk becomes the second distance, and controls the servo unit to continue performing the gap servo operation when the gap between the light focusing element and the disk becomes the second distance.

According to another aspect, the control unit reduces the actuator driving voltage to control the actuator to move the light focusing element away from the disk if the first distance, which is shorter than a distance at which a near-field begins, is not detected when the actuator driving voltage reaches a predetermined maximum driving voltage, detects the gap between the light focusing element and the disk, maintains the actuator driving voltage when the gap between the light focusing element and the disk becomes the first distance, detects runout of the disk while maintaining the actuator driving voltage, and starts the gap servo operation when the gap between the light focusing element and the disk becomes the second distance.

According to another aspect of the present invention, an optical disk apparatus includes a light source to emit light, a light focusing element arranged to face a disk and focus the emitted light on the disk, an actuator to move the light focusing element towards and away from the disk according to an actuator driving voltage, a light intensity detection unit to detect an intensity of light reflected by the disk and to generate a gap error signal based on the detected intensity, a servo unit to generate the actuator driving voltage based on the generated gap error signal generated by the light intensity detection unit and to provide the generated actuator driving voltage to the actuator, a distance detection unit to detect a distance at which a gap servo operation should be started; and a control unit to control the servo unit to start the gap servo operation based on the detected distance.

According to another aspect of the present invention, an optical disk apparatus includes: a light source to emit a light, a light focusing element arranged to face a disk and to focus light emitted from a light source on the disk; an actuator to move the light focusing element towards and away from the disk according to an actuator driving voltage, a light intensity detection unit to detect an intensity of light reflected by the disk and to generate a gap error signal based on the detected intensity, a servo unit to generate the actuator driving voltage applied to the actuator and a predetermined threshold voltage based on the gap error signal generated by the light intensity detection unit and to provide the actuator driving voltage to the actuator, and a control unit to maintain the actuator driving voltage for a predetermined period of time when the threshold voltage is detected, and then to control the servo unit to start a gap servo operation.

According to another aspect, the control unit starts the gap servo operation when a distance between the light focusing element and the disk is between a distance at which a near-field effect begins and a distance at which the actuator driving voltage is, controls the actuator to move the light focusing element to the distance at which the actuator driving voltage is maintained, and controls the servo unit to continue performing the gap servo operation at the distance at which the actuator driving voltage is maintained.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Throughout the drawings, like reference numerals refer to like elements.

Figure 1:
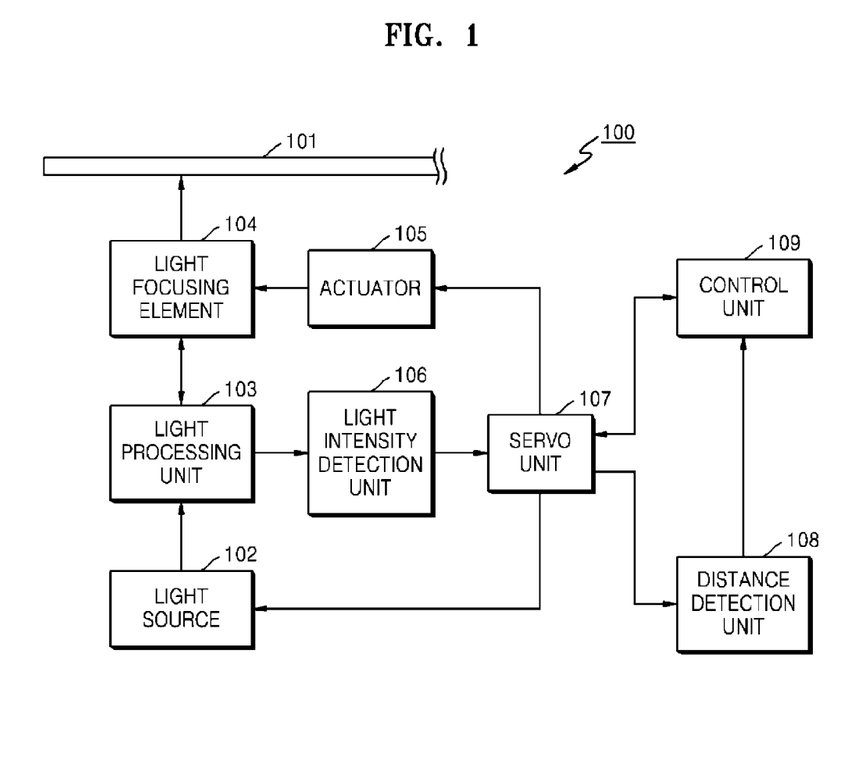
FIG. 1 is a block diagram illustrating a configuration of a near-field optical disk apparatus according to an embodiment of the present invention.

FIG. 1 is a block diagram illustrating a configuration of a near-field optical disk apparatus 100 according to an embodiment of the present invention. Referring to FIG. 1, the near-field optical disk apparatus 100 includes a light source 102, a light processing unit 103, a light focusing element 104, an actuator 105, a light intensity detection unit 106, a servo unit 107, a distance detection unit 108, and a control unit 109. It is understood that the optical disk apparatus 100 may include more components than those shown in FIG. 1 and described below, such as additional focusing elements, photodetectors, servo units, etc.

According to an aspect, the light source 102 maybe a laser diode. The light source 102 emits light when powered on by the servo unit 107. The light processing unit 103 transmits the light emitted from the light source 102 to the light focusing element 104 and transmits light reflected from the light focusing element 104 to the light intensity detection unit 106. To perform this operation, the light processing unit 103 may include, for example, a collimator lens, an anamorphic prism, a beam splitter, a wavelength plate, an achromatic lens, a magnification lens, a wollaston prism, a light focusing lens, and so on.

The light focusing element 104 faces a disk 101. The disk 101 may be various types, including a single layer disk, a multi-layer disk, etc. Also, according to an aspect, the light focusing element 104 is a solid immersion lens (SIL). The light focusing element 104 focuses light transmitted by the light processing unit 103 on the disk 101 as near-field light, in order to record data on the disk 101 or read data recorded on the disk 101. During reproduction of data, the light focusing element 104 receives light reflected or diffracted by the disk 101 and transmits the received light to the light processing unit 103.

The actuator 105 is moved up and down when an actuator driving voltage is applied thereto to move the light focusing element 104 toward or away from the disk 101. That is, the light focusing element 104 approaches the disk 101 when the actuator 105 moves up and moves away from the disk 101 when the actuator 105 moves down. It is understood that the light focusing element 104 and disk 101 are not limited to this configuration, and may instead be configured in other ways, such as, for example, side by side or with the light focusing element 104 disposed above the disk 101, in which case the light focusing element 104 moves toward the disk 101 by moving downward instead of upward.

According to an aspect, the light intensity detection unit 106 detects the intensity of light input thereto, and also generates a gap error signal when reflected or diffracted light is input from the light processing unit 103. However, it is understood that other aspects of the present invention are not limited to this, and the light intensity detection unit 106 may only perform the detecting of the intensity of light input thereto, while the servo unit 107 generates the gap error signal. The detected intensity of light corresponds to the intensity of total-reflection feedback light. The gap error signal is transferred to the distance detection unit 108 and the control unit 109 via the servo unit 107. While not required in all aspects, the light intensity detection unit 106 may be a photo-detector.

Figure 2:
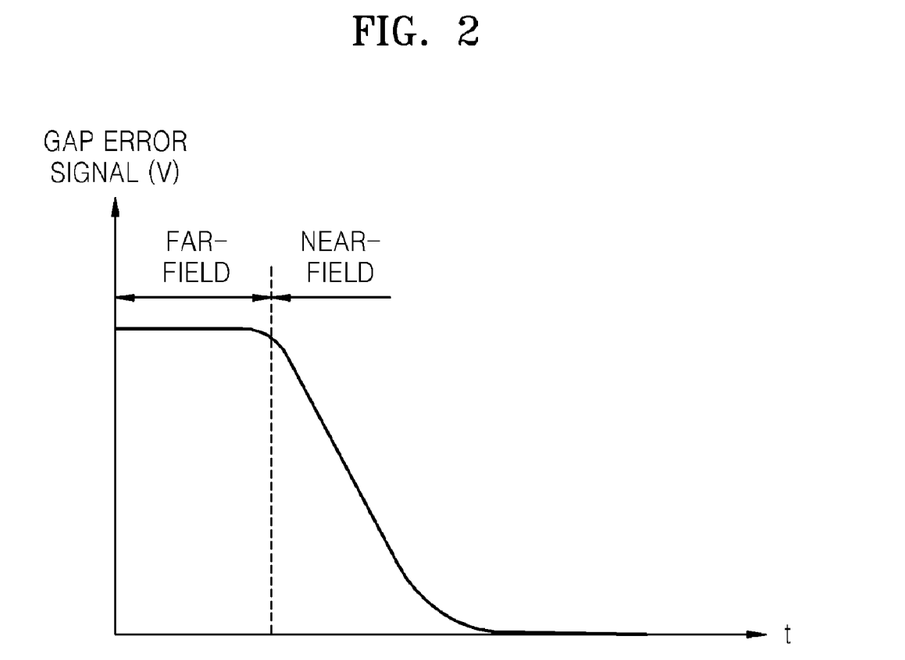
FIG. 2 is a graph illustrating a waveform of a gap error signal generated when an actuator of the near-field optical disk apparatus illustrated in FIG. 1 moves up, according to an embodiment of the present invention.

FIG. 2 is a graph illustrating a waveform of the gap error signal generated by the light intensity detection unit 106 when the actuator 105 moves up (i.e., towards the disk 101), according to an embodiment of the present invention. Referring to FIG. 2, the gap error signal generated by the light intensity detection unit 106 approximates zero as the light focusing element 104 approaches the disk 101. That is, the gap error signal maintains a uniform voltage in a far-field, while the voltage of the gap error signal decreases in a near-field state (i.e., a near-field effect) in which the light focusing element 104 approaches the disk 101. When the light focusing element 104 comes into contact with the disk 101, the voltage of the gap error signal becomes zero. This gap error signal is reduced as the light focusing element 104 approaches the disk 101 because the disk 101 absorbs an increasing amount of the light input from the light focusing element 104 as the light focusing element 104 approaches the disk 101. Thus, the intensity of feedback light reflected by the disk 101 is reduced when the light focusing element 104 approaches the disk 101, and turns into zero when the light focusing element 104 comes into contact with the disk 101. Accordingly, the servo unit 107 drives the actuator 105 such that the gap error signal has a uniform voltage in the near-field. FIG. 2 illustrates the gap error signal generated when the actuator 105 moves up to move the light focusing element 104 towards the disk 101.

The servo unit 107 generates an actuator driving voltage and a predetermined threshold voltage. Preferably, the actuator driving voltage is a "ramp" voltage (i.e., a ramp-shaped voltage that linearly increases or decreases). However, the actuator driving voltage is not limited to such, and voltages other than the ramp voltage can be also used as the actuator driving voltage. When the threshold voltage is detected, the actuator driving voltage is maintained at the same (i.e., a constant) voltage level. The servo unit 107 provides the actuator driving voltage to the actuator 105 and the control unit 109 and supplies the threshold voltage to the distance detection unit 108 and the control unit 109.

According to an aspect of the present invention, the distance detection unit 108 detects a predetermined distance using the gap error signal and the threshold voltage. However, methods of detecting distances according to aspects of the present invention are not limited to the method using the gap error signal. When the threshold voltage generated by the servo unit 107 is detected by the control unit 109, the actuator driving voltage is maintained at the same level and the operation of the actuator 105 is stopped. This point is referred to as a hold level (hereinafter, the term "level" corresponds to a point having a predetermined distance between the light focusing element 104 and the disk 101). Runout of the disk 101, i.e., a lack of circularity in tracks on the disk 101, is detected at the hold level and a gap servo operation is started at a point having a gap less than the distance between the disk 101 and the light focusing element 104 at the hold level. This point is referred to as a target level.

Furthermore, a point at which the gap servo operation is stopped between the target level and a point at which the gap between the light focusing element 104 and the disk 101 corresponds to 0 is referred to as an off level. At the off level, the actuator 105 is moved back such that the actuator 105 recedes from the disk 101 because the light focusing element 104 may collide with the disk 101 if overshoot is excessively large. The hold level, the target level and the off level can be obtained experimentally.

FIGS. 3A-3C, 4A-4C and 5A-5C are graphs illustrating a gap pull-in operation of the near-field optical disk apparatus illustrated in FIG. 1, according to an embodiment of the present invention. The control unit 109 controls the servo unit 107 to start the gap servo operation on the basis of a level detected by the distance detection unit 108. That is, the control unit 109 controls the servo unit 107 to move the actuator 105 up or down, i.e., towards or away from, the disk 101 when the light focusing element 104 starts to approach the disk 101. Accordingly, the servo unit 107 powers on the light source 102 and transmits the gap error signal received from the light intensity detection unit 106 and the actuator driving voltage and the threshold voltage generated by the servo unit 107 to the control unit 109.

Figure 3A:
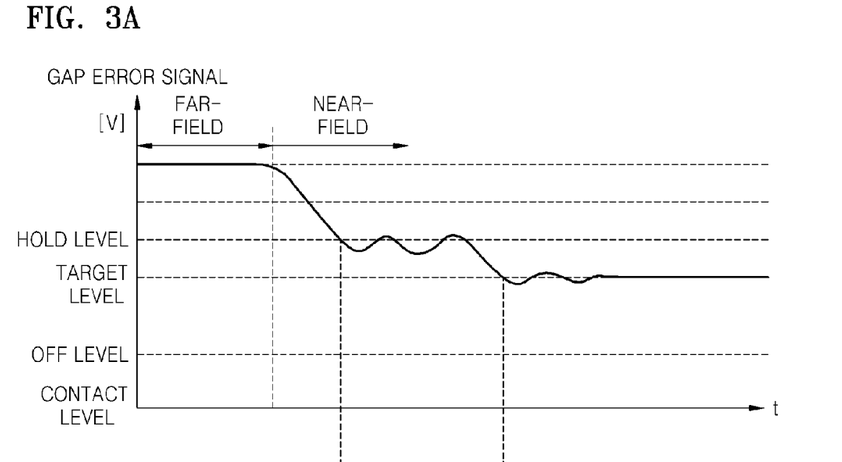
FIGS. 3A-3C, 4A-4C and 5A-5C are graphs illustrating a gap pull-in operation of the near-field optical disk apparatus illustrated in FIG. 1, according to an embodiment of the present invention.
Figure 3B:
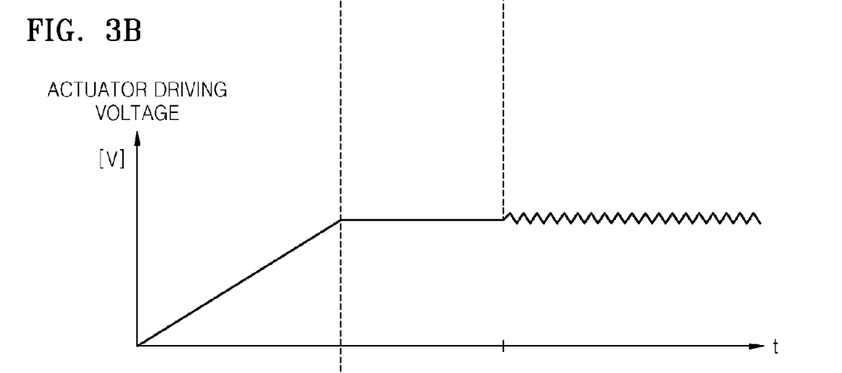
Figure 3C:
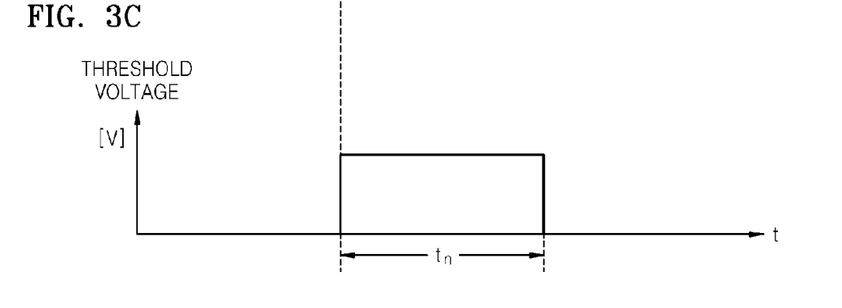

Referring to FIG. 3A and FIG. 3B, when the distance detection unit 108 detects the hold level and transmits information indicating that the hold level has been reached to the control unit 109, the control unit 109 maintains the actuator driving voltage at the hold level, which corresponds to a gap error signal that is lower than a point at which a near-field begins, and stops the operation of the actuator 105. Here, disk runout occurs. The disk runout corresponds to several to hundreds of μm and causes the disk 101 to approach the actuator 105 while the actuator 105 is stopped. Accordingly, the gap error signal is changed according to a gap between the disk 101 and the light focusing element 104, and the distance detection unit 108 detects a desired target level and transmits the target level to the control unit 109. Then, the control unit 109 controls the servo unit 107 to start the gap servo operation. When the distance detection unit 108 detects the off level and transmits the off level to the control unit 109, the control unit 109 stops the gap servo operation and moves the actuator 105 such that the light focusing element 104 recedes from the disk 101 to prevent the light focusing element 104 and the disk 101 from colliding with each other.

Figure 4A:
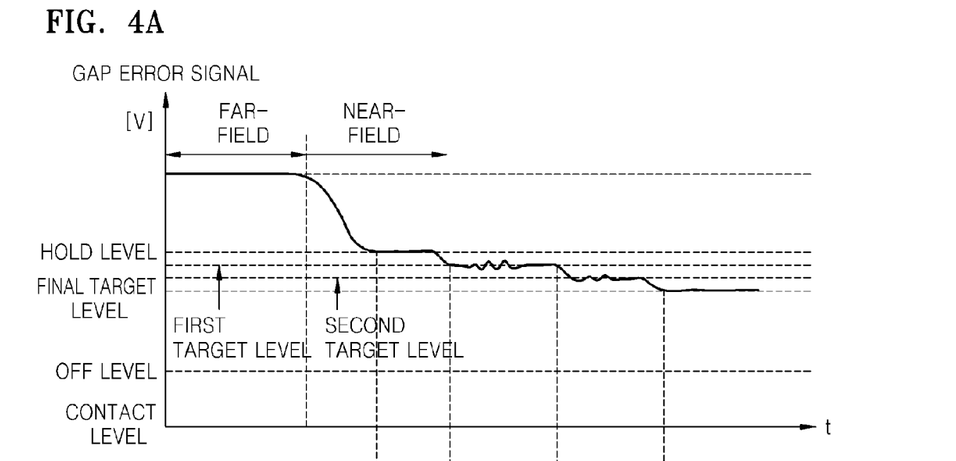
Figure 4B:
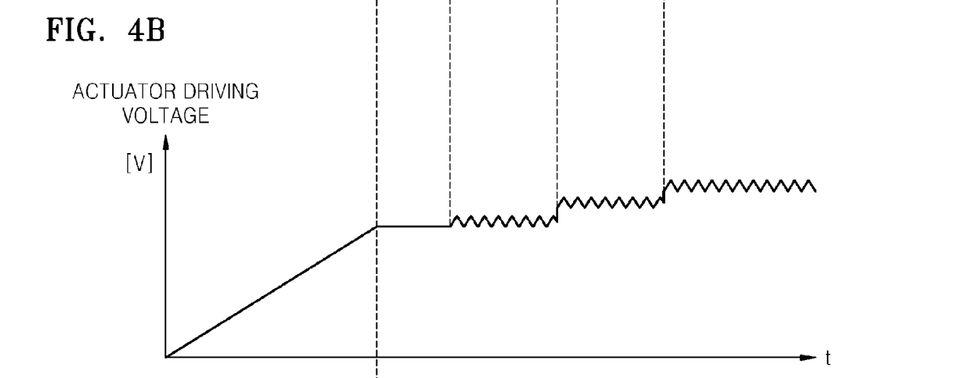
Figure 4C:
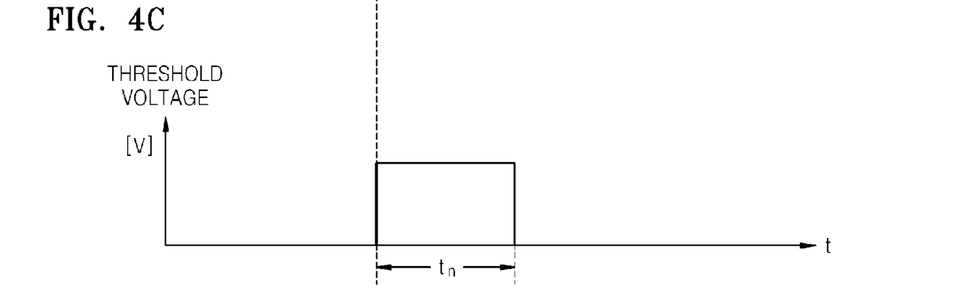

Referring to FIG. 4A and FIG. 4B, to reduce overshoot, additional target levels are set. For example, a first target level is set and a gap servo operation is started. Subsequently, a second target level is set and the gap servo operation is performed. Then, a final target level is set and the gap servo operation is performed. As the number of target levels increases, the overshoot decreases and the gap servo operation locks onto the target level in a more stable fashion. It is understood that more or less than two additional target levels may be set.

Figure 5A:
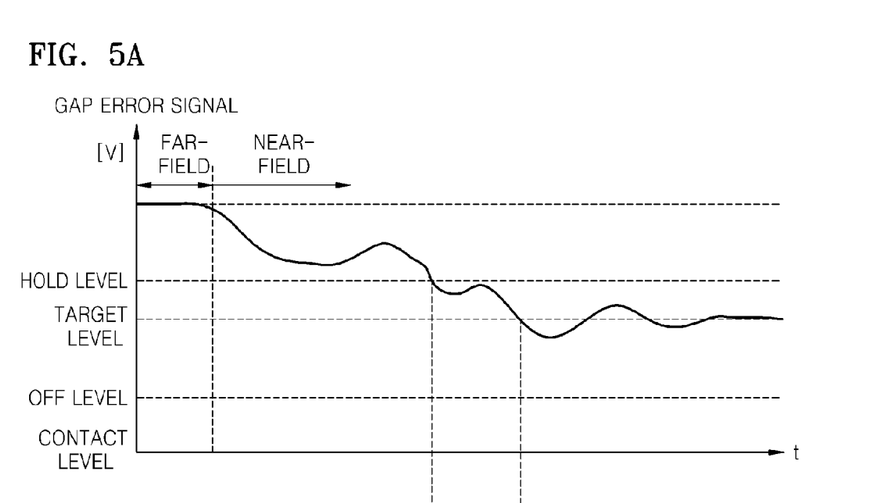
Figure 5B:
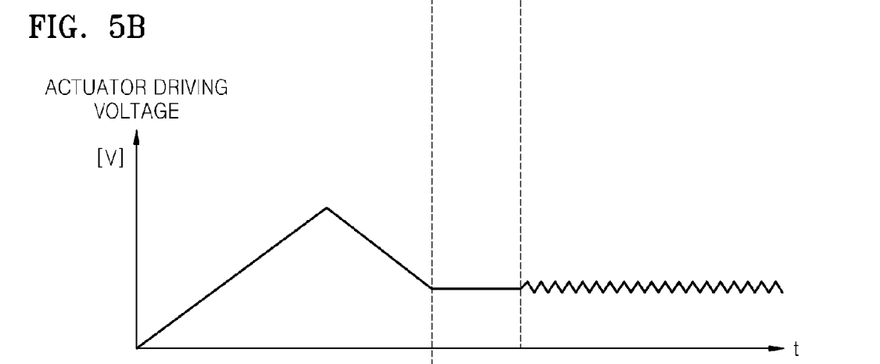
Figure 5C:
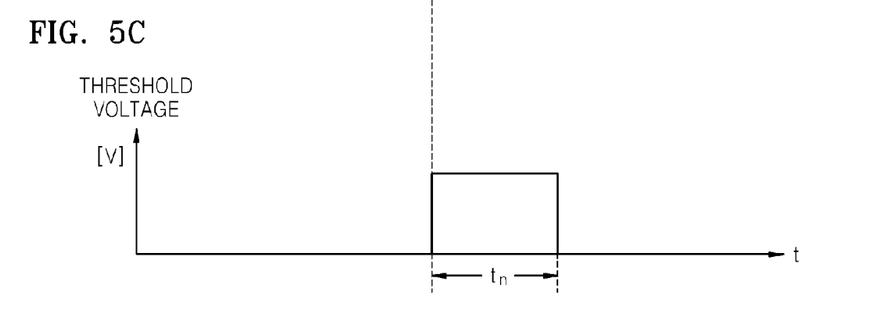

Referring to FIG. 5A and FIG. 5B, when the distance detection unit 108 cannot detect a distance corresponding to the hold level even though the actuator driving voltage is applied to the actuator 105 to move the light focusing element 104 towards the disk 101, the control unit 109 reduces the actuator driving voltage after a predetermined maximum driving voltage is applied to the actuator 105. Here, the control unit 109 controls the servo unit 107 to move the actuator 105. When the servo unit 107 generates the threshold voltage while the actuator 105 descends away from the disk 101 as shown in FIG. 5C, the distance detection unit 108 detects the hold level and transmits information indicating the detection of the hold level to the control unit 109. In the shown example, the operation after this holding operation is identical to the operation described with reference to FIG. 3A, and thus the explanation thereof is not repeated here. When an actuator descending speed is reduced to be slower than a disk runout speed, the gap between the light focusing element 104 and the disk 101 decreases. Thus, the possibility of detecting the hold level increases.

Figure 6:
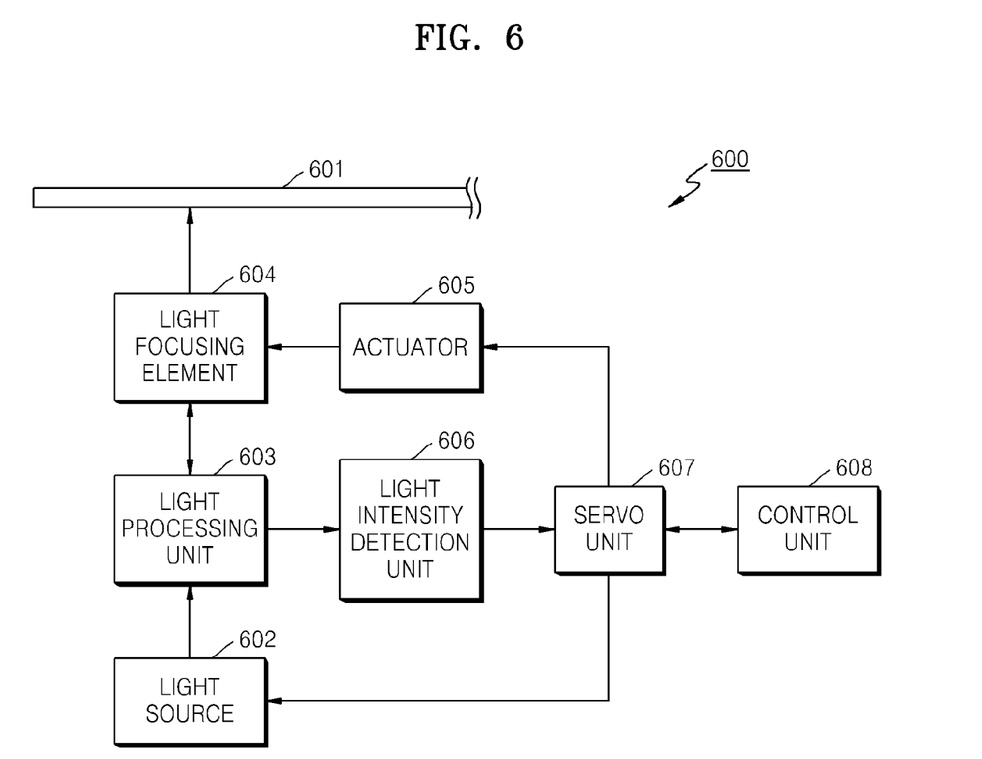
FIG. 6 is a block diagram illustrating a configuration of a near-field optical disk apparatus according to another embodiment of the present invention.

FIG. 6 is a block diagram illustrating a configuration of a near-field optical disk apparatus 600 according to another embodiment of the present invention. Referring to FIG. 6, the near-field optical disk apparatus 600 includes a light source 602, a light processing unit 603, a light focusing element 604, an actuator 605, a light intensity detection unit 606, a servo unit 607, and a control unit 608. The light source 602, the light processing unit 603, the light focusing element 604, the actuator 605, the light intensity detection unit 606 and the servo unit 607 are substantially the same as to the corresponding components of the near-field optical disk apparatus 100 illustrated in FIG. 1, and thus explanations thereof are not repeated here. Unlike the near-field optical disk apparatus 100 illustrated in FIG. 1, however, the near-field optical disk apparatus 600 illustrated in FIG. 6 does not separately include the distance detection unit 108.

Figure 7A:
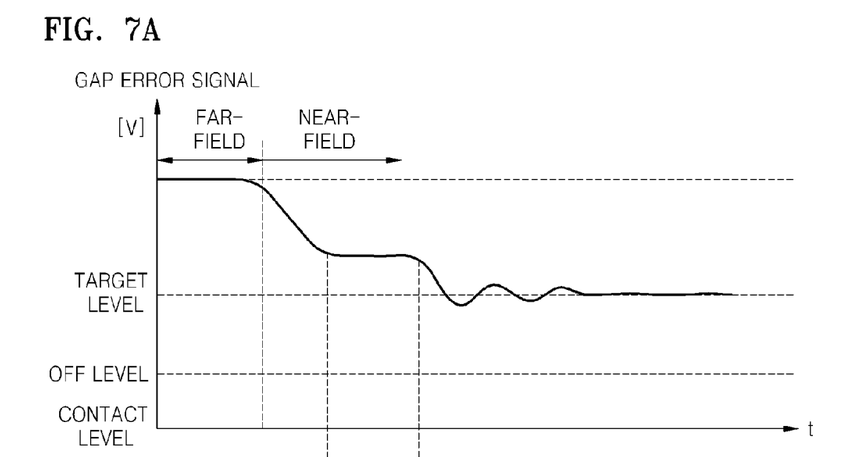
FIGS. 7A-7C and 8A-8C are graphs illustrating a gap pull-in operation of the near-field optical disk apparatus illustrated in FIG. 6, according to an embodiment of the present invention.
Figure 7B:
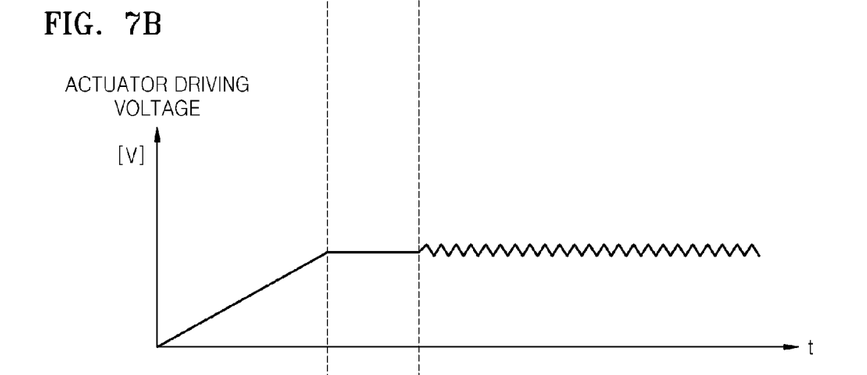
Figure 7C:
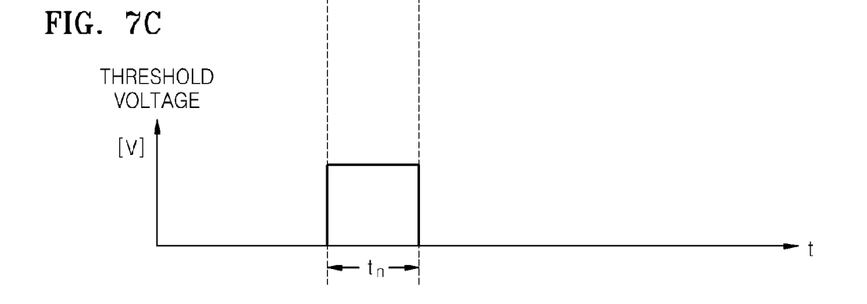

FIGS. 7A-7C include a series of graphs illustrating a gap pull-in operation of the near-field optical disk apparatus 600 illustrated in FIG. 6, according to an embodiment of the present invention. Referring to FIGS. 6 and 7A-7C, when the servo unit 607 generates a threshold voltage, the control unit 608 detects the threshold voltage, maintains an actuator driving voltage and stops the operation of the actuator 605 when the actuator driving voltage matches the threshold voltage. When the actuator 605 is stopped, the momentum of the actuator 605 reaches a peak value. Thus, the control unit 608 controls the actuator 605 to reduce the momentum of the actuator 605 while detecting the threshold voltage. The control unit 608 controls the servo unit 607 to start a gap servo operation after a predetermined lapse of time $t_n$ or when the threshold voltage is not detected any more. As such, a separate distance detection unit 108 is not used, but can be in other aspects.

Figure 8A:
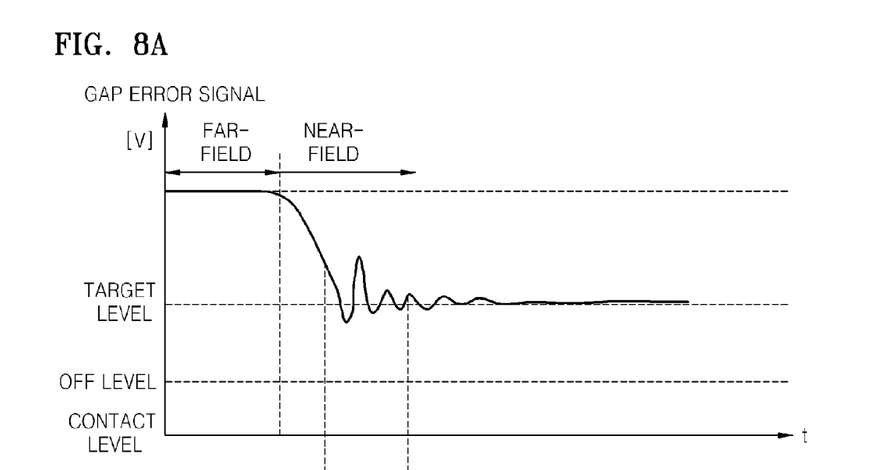
Figure 8B:
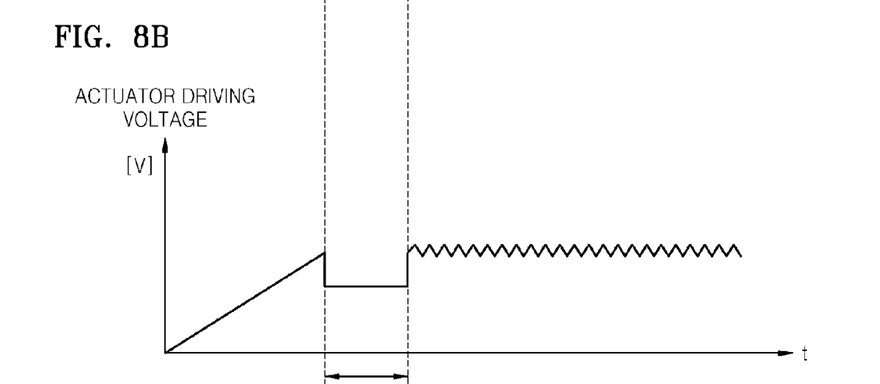
Figure 8C:
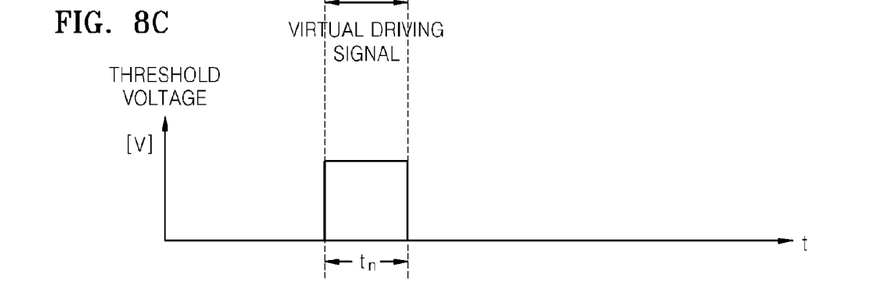

FIGS. 8A-8C include a series of graphs illustrating a gap pull-in operation of the near-field optical disk apparatus 600 illustrated in FIG. 6 using an arbitrarily generated driving signal, according to an embodiment of the present invention. Referring to FIGS. 8A-8C, a virtual driving signal is applied for a predetermined period of time to track a target level when a gap servo operation is started. Here, the virtual driving signal cancels the momentum of the actuator 605. The momentum of the actuator 605 is generated when the actuator 605 approaches the disk 601 when a ramp signal is applied to the actuator 605. The virtual driving signal, which is opposite to the ramp signal, is applied when the gap servo operation is started. The actuator 605 is located close to the disk 601 at this point, and the virtual driving signal controls the actuator 605 to recede from the disk 601. Thus, the initial momentum of the actuator 605 is cancelled.

Figure 9:
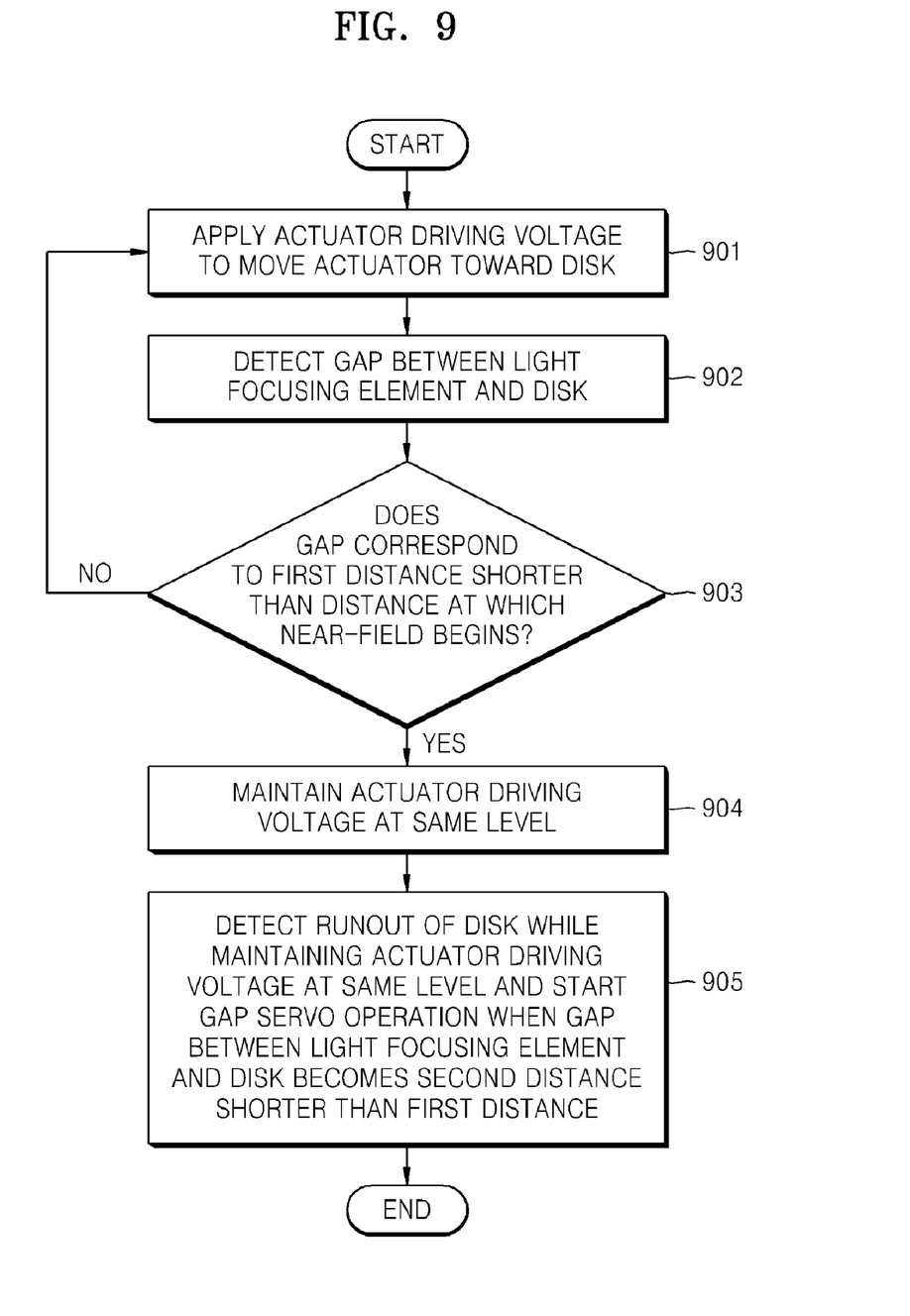
FIG. 9 is a flow chart of a gap pull-in method performed using the near-field optical disk apparatus of FIG. 1 according to an embodiment of the present invention.

FIG. 9 is a flow chart of a gap-pull in method performed using the near-field optical disk apparatus 100 of FIG. 1, according to an embodiment of the present invention. Referring to FIGS. 1 and 9, an actuator driving voltage is applied to the actuator 105 of the near-field optical disk apparatus 100 to move the actuator 105 toward the disk 101 in operation 901. Preferably, the actuator driving voltage is a linearly increasing ramp voltage, but need not be in all aspects.

A gap between the light focusing element 104 and the disk 101 is detected as the actuator 105 moves up in operation 902. While not required in all aspects, the gap can be detected using a gap error signal generated by the light intensity detection unit 106.

A first distance, which is shorter than a distance between the disk 101 and the light focusing element at which a near-field begins, is detected in operation 903. A point at which the distance detection unit 108 detects a threshold voltage, which is generated by the servo unit 107, is set as the first distance.

When the gap between the light focusing element 104 and the disk 101 corresponds to the first distance, the actuator driving voltage is maintained at the same level in operation 904. When the actuator driving voltage is maintained at the same level, the upward movement of the actuator 105 is stopped.

In operation 905, disk runout is detected while the actuator driving voltage is maintained at the same level, and a gap servo operation is started when the gap between the light focusing element 104 and the disk 101 becomes a second distance which is shorter than the first distance. The second distance corresponds to a point at which the gap servo operation is performed. Since the disk runout corresponds to several to hundreds of μm, the disk 101 approaches the actuator 105 while the actuator 105 is stopped. As a result, the gap error signal is changed according to the gap between the disk 101 and the light focusing element 104. Accordingly, a desired target level is detected and the gap servo operation is started.

Furthermore, at least one target level is set, and the gap servo operation is performed at a distance corresponding to a desired final target level while varying a distance between the actuator 105 and the disk 101 corresponding to the at least one target level. In this way, overshoot is reduced and the gap servo operation can be stabilized. Although FIG. 4A illustrates a first, second, and final target level, it is understood that more or less than three target levels may be used to reduce overshoot.

Excessively large overshoot may cause the light focusing element 104 and the disk 101 to collide with each other. Accordingly, the gap servo operation is stopped at a point between the target level and a point at which the gap between the light focusing element 104 and the disk 101 becomes 0. An off level corresponding to a point at which the actuator 105 is moved back from the disk 101 is set to protect the near-field optical disk apparatus 100.

Figure 10:
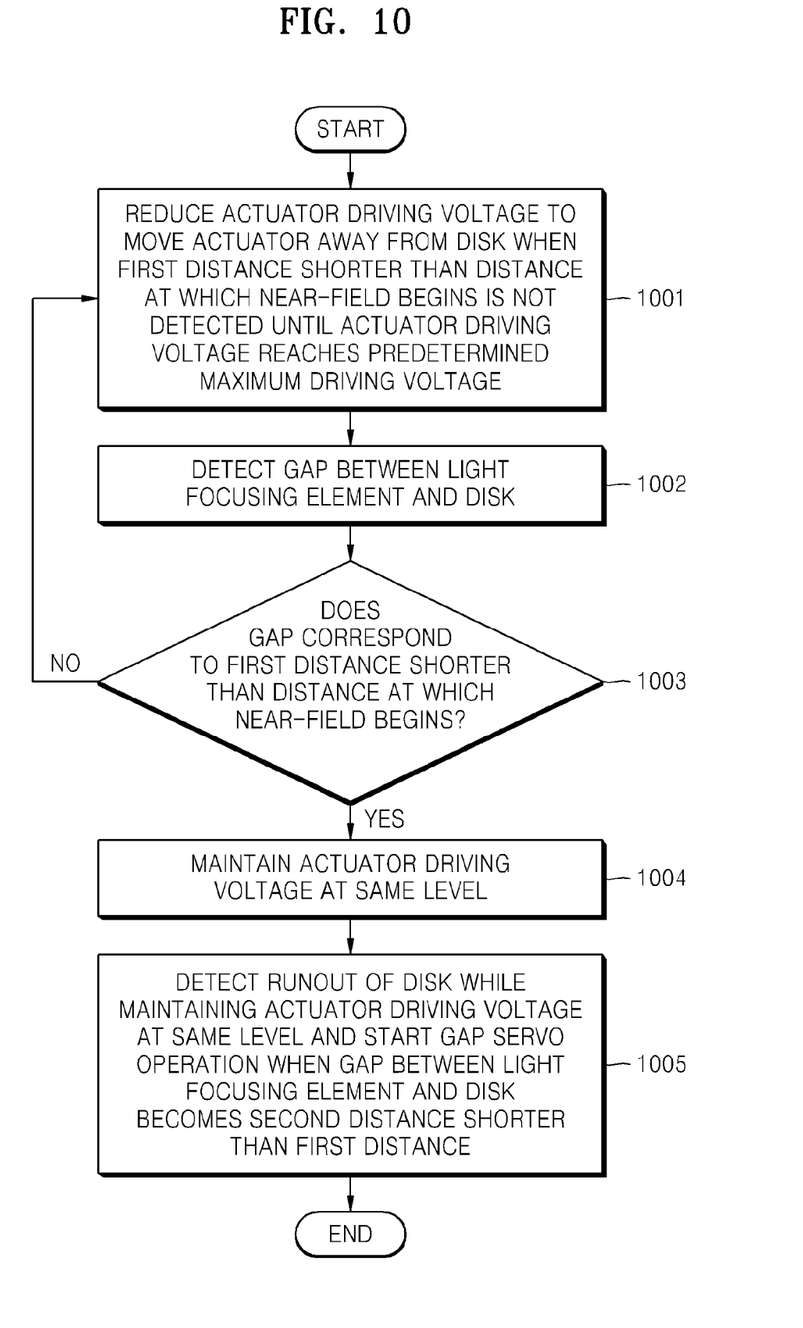
FIG. 10 is a flow chart of a gap pull-in method performed using the near-field optical disk apparatus of FIG. 1, according to another embodiment of the present invention.

FIG. 10 is a flow chart of a gap-pull in method performed using the near-field optical disk apparatus 100 of FIG. 1, according to another embodiment of the present invention. Referring to FIG. 10, when the first distance is not detected even though the actuator 105 is moved up towards the disk 101 until the actuator driving voltage reaches a predetermined maximum driving voltage, the actuator driving voltage is reduced to descend the actuator 105 away from the disk 101 in operation 1001. Furthermore, even when a distance corresponding to the target level is not detected at the hold level for a predetermined period of time while the actuator 105 moves up, the actuator driving voltage can be reduced to move the actuator 105 down. Operations 1002, 1003, 1004 and 1005 are similar to operations 902, 903, 904 and 905 illustrated in FIG. 9, respectively, and thus descriptions thereof are not repeated.

Figure 11:
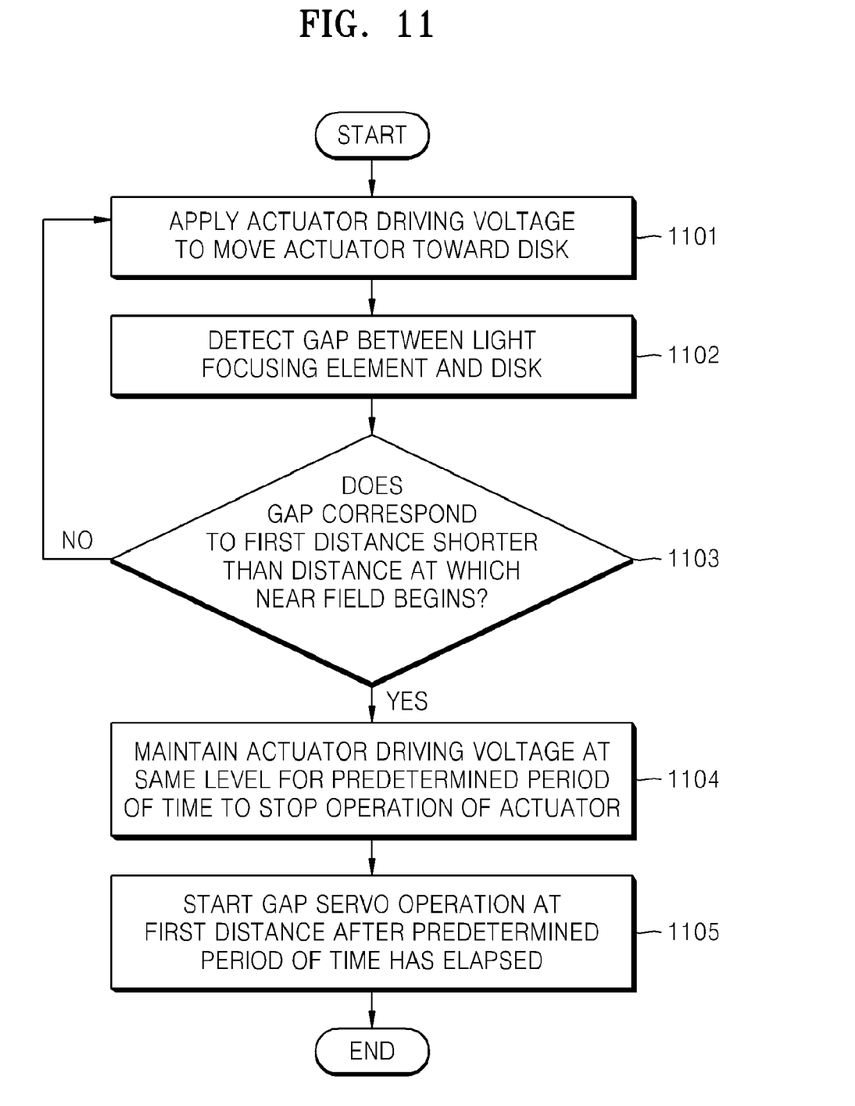
FIG. 11 is a flow chart of a gap pull-in method performed using the near-field optical disk apparatus of FIG. 1, according to another embodiment of the present invention.

FIG. 11 is a flow chart of a gap-pull in method performed using the near-field optical disk apparatus 100 of FIG. 1 according to another embodiment of the present invention. Operations 1101, 1102 and 1103 are similar to operations 901, 902 and 903 illustrated in FIG. 9, respectively, and thus descriptions thereof are not repeated.

The actuator driving voltage is maintained at a same level for a predetermined period of time to stop the movement of the actuator 105 while the threshold voltage is detected in operation 1104. As a result, the momentum of the actuator 105 is reduced to decrease overshoot. After a predetermined lapse of time $t_n$ (FIG. 8C), that is, during which the threshold voltage is not detected, the gap servo operation is started at the first distance in operation 1105.

Aspects of the present invention can also be embodied as computer readable codes on a computer readable recording medium. The computer readable recording medium is any data storage device that can store data which can be thereafter read by a computer system. Examples of computer readable recording media include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distribution fashion.

As described above, aspects of the present invention prevent the light focusing element 104 and the disk 101 from colliding with each other due to overshoot generated during a gap pull-in operation, thereby preventing the near-field optical disk apparatus 100 from being damaged, and stabilizing a gap pull-in operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A gap pull-in method for an optical disk apparatus comprising a light source emitting light, a light focusing element arranged to face a disk and to focus the light emitted from the light source on the disk, and an actuator to move the light focusing element towards or away from the disk, the gap pull-in method comprising:
applying an actuator driving voltage to the actuator to move the light focusing element toward the disk;
detecting a gap between the light focusing element and the disk;
maintaining the applied actuator driving voltage when the gap between the light focusing element and the disk becomes a first distance which is shorter than a distance at which a near-field effect begins;
detecting runout of the disk while maintaining the actuator driving voltage; and
performing a gap servo operation when the gap between the light focusing element and the disk becomes a second distance which is shorter than the first distance as a result of the detected runout.

2. The gap pull-in method of claim 1, wherein the gap between the light focusing element and the disk is detected using a gap error signal.

3. The gap pull-in method of claim 1, wherein the maintaining of the actuator driving voltage comprises maintaining the actuator driving voltage when a threshold voltage corresponding to the first distance is detected.

4. The gap pull-in method of claim 1, wherein the maintaining of the actuator driving voltage comprises stopping a movement of the actuator.

5. The gap pull-in method of claim 1, further comprising stopping the gap servo operation and controlling the actuator to move the light focusing element away from the disk when the gap between the light focusing element and the disk becomes a third distance shorter than the second distance.

6. The gap pull-in method of claim 1, wherein the actuator driving voltage comprises a ramp voltage.

7. The gap pull-in method of claim 1, further comprising starting the gap servo operation in at least one predetermined gap between the first distance and the second distance, controlling the actuator to move the light focusing element towards the disk until the gap between the light focusing element and the disk becomes the second distance, and continuing to perform the gap servo operation when the gap between the light focusing element and the disk becomes the second distance.

8. An optical disk apparatus comprising:
a light source to emit a light;
a light focusing element arranged to face a disk and to focus the emitted light on the disk;
an actuator to move the light focusing element towards and away from the disk according to an actuator driving voltage;
a light intensity detection unit to detect an intensity of light reflected by the disk and generate a gap error signal based on the detected intensity;
a servo unit to generate the actuator driving voltage and a predetermined threshold voltage based on the generated gap error signal and to provide the actuator driving voltage to the actuator;
a distance detection unit to detect a first distance at which the provided actuator driving voltage is maintained when the threshold voltage is detected using the generated gap error signal, and to detect a second distance at which a gap between the light focusing element and the disk is shorter than the first distance and at which a gap servo operation is started based on the gap error signal; and
a control unit to control the servo unit to start the gap servo operation based on the detected first and second distances.

9. The optical disk apparatus of claim 8, wherein the control unit applies the actuator driving voltage to the actuator to move the light focusing element toward the disk, detects the gap between the light focusing element and the disk, maintains the actuator driving voltage when the detected gap becomes the first distance, detects runout of the disk while maintaining the actuator driving voltage, and controls the servo unit to start the gap servo operation when the gap between the light focusing element and the disk becomes the second distance.

10. The optical disk apparatus of claim 9, wherein the control unit controls the servo unit to stop a movement of the actuator when maintaining the provided actuator driving voltage.

11. The optical disk apparatus of claim 9, wherein the control unit starts the gap servo operation in at least one predetermined gap between the first distance and the second distance, controls the actuator to move the light focusing element towards the disk until the gap between the light focusing element and the disk becomes the second distance, and controls the servo unit to continue performing the gap servo operation when the gap between the light focusing element and the disk becomes the second distance.

12. The optical disk apparatus of claim 8, wherein the control unit detects the gap between the light focusing element and the disk using the generated gap error signal.

13. The optical disk apparatus of claim 8, wherein the distance detection unit detects a third distance at which the gap between the light focusing element and the disk is shorter than the second distance, stops the gap servo operation when the third distance is detected, and controls the actuator to move the light focusing element away from the disk when the gap servo operation is stopped.

14. The optical disk apparatus of claim 8, wherein the control unit reduces the actuator driving voltage to control the actuator to move the light focusing element away from the disk if the first distance, which is shorter than a distance at which a near-field begins, is not detected when the actuator driving voltage reaches a predetermined maximum driving voltage, detects the gap between the light focusing element and the disk, maintains the actuator driving voltage when the gap between the light focusing element and the disk becomes the first distance, detects runout of the disk while maintaining the actuator driving voltage, and starts the gap servo operation when the gap between the light focusing element and the disk becomes the second distance.

* * * * *